United States Patent
Dirk et al.

(10) Patent No.: US 7,955,945 B1
(45) Date of Patent: Jun. 7, 2011

(54) WEAK-LINK CAPACITOR

(75) Inventors: Shawn M. Dirk, Albuquerque, NM (US); Ross S. Johnson, Albuquerque, NM (US); David R. Wheeler, Albuquerque, NM (US); Gregory R. Bogart, Corrales, NM (US)

(73) Assignee: Sandia Corporation, Aubuquerque, NM (US)

( * ) Notice: Subject to any disclaimer, the term of this patent is extended or adjusted under 35 U.S.C. 154(b) by 0 days.

(21) Appl. No.: 12/892,055

(22) Filed: Sep. 28, 2010

(51) Int. Cl.
 *H01L 21/20* (2006.01)
(52) U.S. Cl. ........ 438/393; 438/239; 438/243; 438/250; 438/253; 438/386; 438/396; 438/780; 257/E21.008; 257/E21.396; 257/E21.647; 257/E21.007
(58) Field of Classification Search .............. 438/239, 438/243, 250, 253, 386, 393, 396, 780, FOR. 220, 438/FOR. 430; 257/E21.008, E21.396, E21.647, 257/E21.007
See application file for complete search history.

(56) References Cited

U.S. PATENT DOCUMENTS
2009/0110811 A1* 4/2009 Ding et al. .............. 427/80

OTHER PUBLICATIONS

Ajayaghosh, A., Das, S., and George, M.V., "S-Benzoyl O-Ethyl Xanthate as a New Photoinitiator: Photopolymerization and Laser Flash Photolysis Studies," J. of Polymer Scie.
Johnson, R.S. Cicotte, K.N., Mahoney, P.J., Tuttle, B.A., and Dirk, S.M., "Thermally Induced Failure of Polymer Dielectrics," Adv. Mater. 22, 1750-1753, 2010.

* cited by examiner

*Primary Examiner* — Michelle Estrada
(74) *Attorney, Agent, or Firm* — Elmer Klauetter; Kevin W. Bieg

(57) ABSTRACT

A process for making a dielectric material where a precursor polymer selected from poly(phenylene vinylene) polyacetylene, poly(p-phenylene), poly(thienylene vinylene), poly(1,4-naphthylene vinylene), and poly(p-pyridine vinylene) is energized said by exposure by radiation or increase in temperature to a level sufficient to eliminate said leaving groups contained within the precursor polymer, thereby transforming the dielectric material into a conductive polymer. The leaving group in the precursor polymer can be a chloride, a bromide, an iodide, a fluoride, an ester, an xanthate, a nitrile, an amine, a nitro group, a carbonate, a dithiocarbamate, a sulfonium group, an oxonium group, an iodonium group, a pyridinium group, an ammonium group, a borate group, a borane group, a sulphinyl group, or a sulfonyl group.

8 Claims, 8 Drawing Sheets

WEAK-LINK CAPACITOR

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

BACKGROUND OF THE INVENTION

The present invention relates to a capacitor and, more particularly, to a thin-film stacked capacitor utilizing poly (phenylene vinylene) polyacetylene, poly(p-phenylene), poly (thienylene vinylene), poly(1,4-naphthylene vinylene), and poly(p-pyridine vinylene) precursor polymers containing leaving groups that can be converted to conducting polymers under UV irradiation or elevated temperature.

Planar or rolled capacitors are typically produced from film layers that are metalized and stacked together. Alternatively, capacitors can be fabricated by sandwiching polymer dielectrics between thin metal films. These types of capacitors have been shown to be useful in electronics, display and energy industries.

Some applications require a weak-link capacitor in which the employed dielectric materials can fail as a short by conjugating at specific temperatures. By employing a capacitor dielectric that can convert to a conductive state, the build-up and uncontrolled discharge of electricity in the event of a fire or overheating would be averted, providing a fundamental safety mechanism for high-voltage electrical devices.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
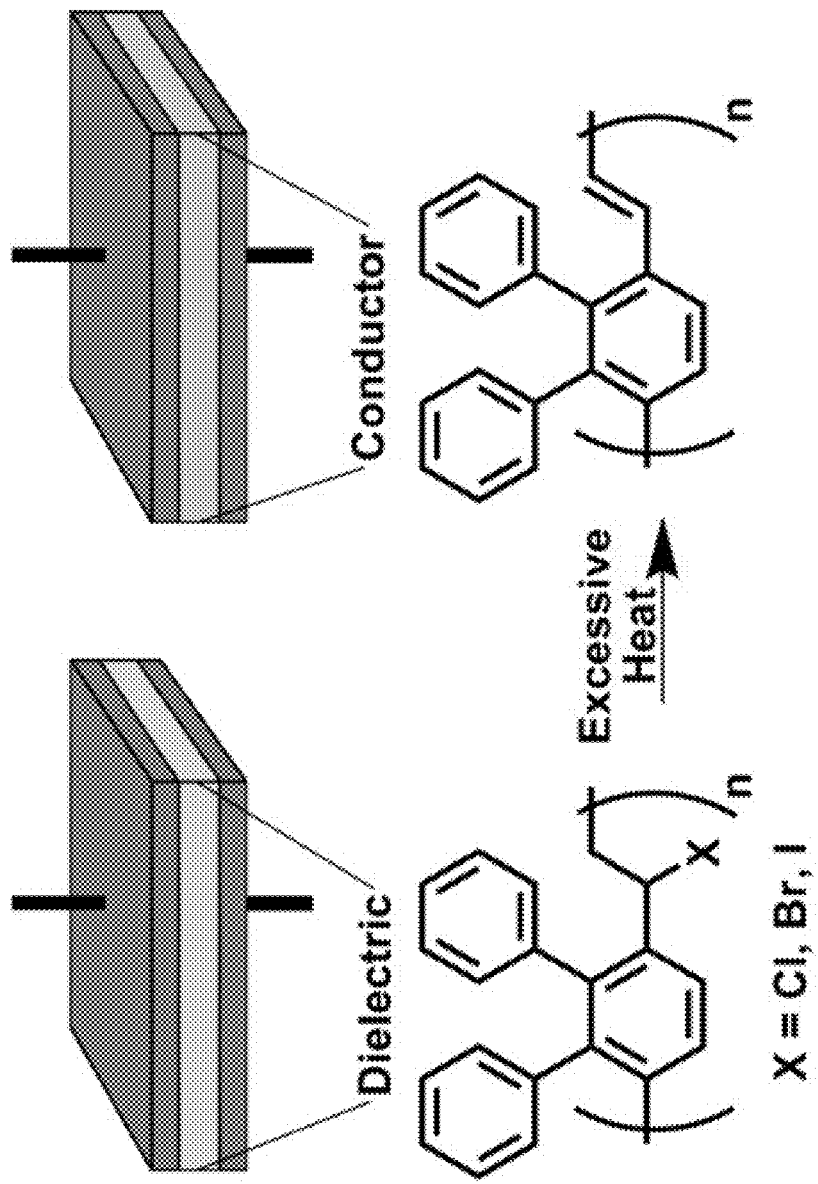
FIG. 1 illustrates a polymer that functions as a dielectric until an elevated temperature is reached, where the halide components are eliminated to convert the polymer into a conjugated state.

Poly(phenylene vinylenes) (PPVs), polyacetylene, poly(p-phenylene), poly(thienylene vinylene), poly(1,4-naphthylene vinylene), and poly(p-pyridine vinylene) are included within a class of conjugated polymers with applications ranging from light-emitting diodes to photovoltaics. Poly(phenylene vinylene) (PPV) polyacetylene, poly(p-phenylene), poly (thienylene vinylene), poly(1,4-naphthylene vinylene), and poly(p-pyridine vinylene) precursor polymers containing leaving groups, such as halogens, can be converted to conducting polymers under ultraviolet irradiation (UV) or high temperatures; that is, the polymer is energized to a state that the leaving groups are eliminated from the polymer. In one embodiment, FIG. 1 illustrates a polymer that functions as a dielectric until an elevated temperature is reached, such as due to excessive heating, where the leaving group (for example, halides, xanthates, and esters) components of the polymer are eliminated to convert the polymer into a conjugated state, thereby preventing capacitor charging. The polymer thus acts as a thermal weak link which can be tuned to transform from a dielectric to a semiconducting or conducting material at a desired temperature range by using particular leaving groups which are eliminated at that temperature range. The temperature at which the leaving groups are eliminated can be pre-determined by such diagnostic tools as thermogravimetric analyses.

Furthermore, these conjugated polymer precursor oligomers can be tethered to the backbone of another polymer (or oligomer) that contains an orthogonal photo-polymerizable group. Two separate photo-activated functional groups enable the polymerization (or crosslinking) reaction to occur at a separate time and location from the conversion to conducting polymers. If this chemistry is combined with a technique like Stimulated Emission Depletion Lithography (STED), potentially very thin conducting traces could be formed. This has potential application for the creation of polymeric vias to connect different conducting layers in lithographic processes or for the fabrication of all polymer electronics. The ability to pattern the semiconducting or conducting polymer also enables the fabrication of simple RC circuits.

Figure 2:
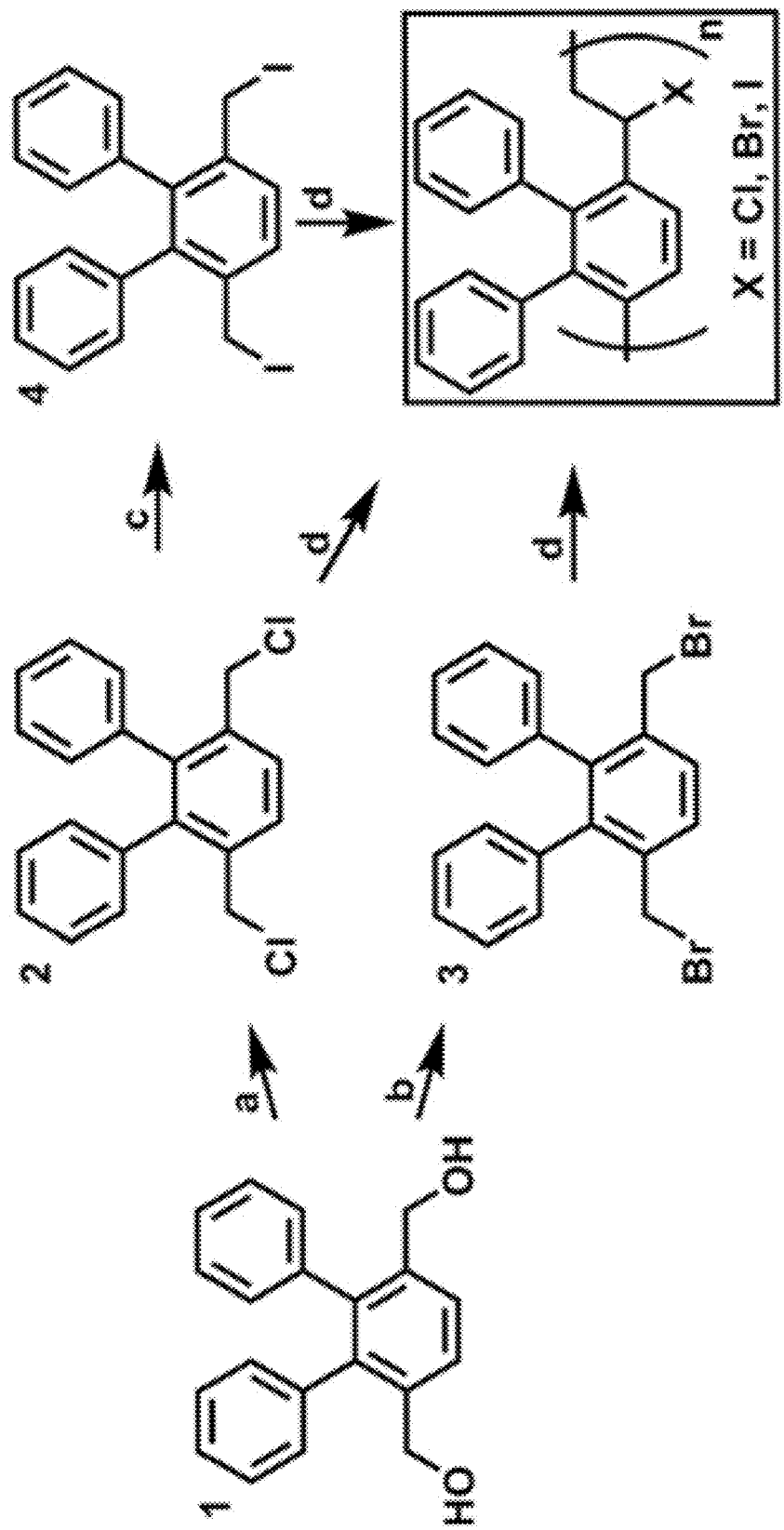
FIG. 2 illustrating the conversion of a poly(p-phenylene vinylenes) (PPV) precursor material that can be photo-chemically converted using a direct-write process to form a conductive element in a 3D orientation.
Figure 3:
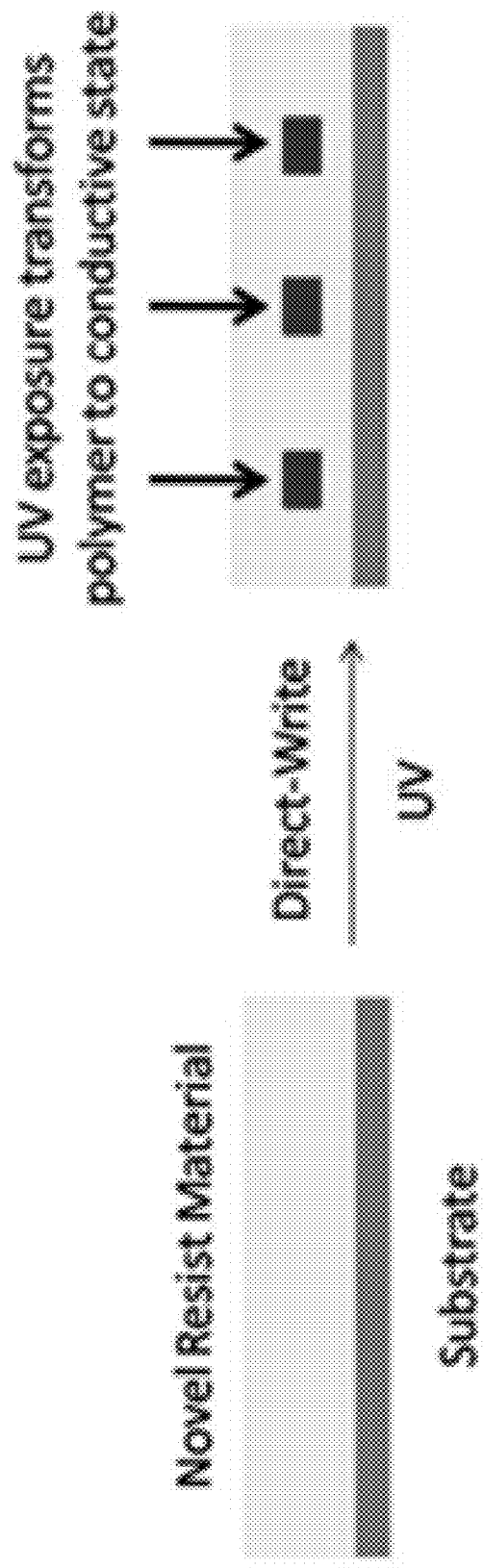
FIG. 3 illustrates one example of a novel resist that contains a PPV precursor oligomer tethered to the backbone of a high molecular weight polyacrylate.

One potential embodiment is illustrated in FIG. 2, illustrating the conversion of a PPV precursor material that can be photo-chemically converted using a direct-write process like (STED) to form a conductive element in a 3D orientation. FIG. 3 illustrates one example of a novel resist that contains a PPV precursor oligomer tethered to the backbone of a high molecular weight polyacrylate. When the polyacrylate is exposed to UV radiation the tethered oligomer transitions to a self-doping conducting polyphenylene vinylene polymer.

To overcome the limited solubility of many PPV polymers, films are cast from the soluble precursor polymers; thermal treatment of the films can then convert the material into its final conjugated state. In one embodiment of the present invention, certain precursor PPV polymers have been developed as dielectric materials that can fail as a short by conjugating at specific temperatures. By employing a capacitor dielectric that can convert to a conductive state, the build-up and discharge of electricity in the event of a fire or overheating would be averted, providing a fundamental safety mechanism for high-voltage electrical devices. The halide components are one example of leaving groups that can be used in the PPV polymers. The capacitors can be formed as known in the art and include both stackable and wound or rolled capacitor structures.

The high dipole density of a halogen precursor polymer to poly[(2,3-diphenyl-p-phenyl)vinylene] (DP-PPV) allows the material to function as a good dielectric. At high temperatures, however, elimination of the halogen has been shown to irreversibly convert the polymer to a conjugated state. In particular, two halogen precursor polymers, a bromo poly(p-phenylene vinylene) compound, $C_{20}H_{16}Br_2$, and an iodo poly (p-phenylene vinylene) compound, $C_{20}H_{16}I_2$, have been developed which effectively thermo-switch the polymers to a conjugated state at particular temperatures. Electrical characterization of the precursor polymers indicates the materials have good dielectric properties; however, once a preset temperature is reached, conjugation of the polymer backbone causes capacitor failure.

Figure 4:
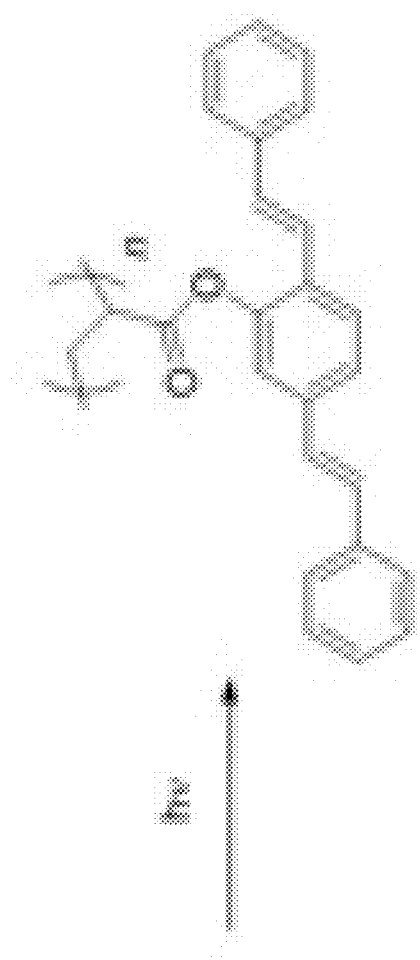
FIG. 4 illustrates PPV precursor polymers with halogen leaving groups.
Figure 4:
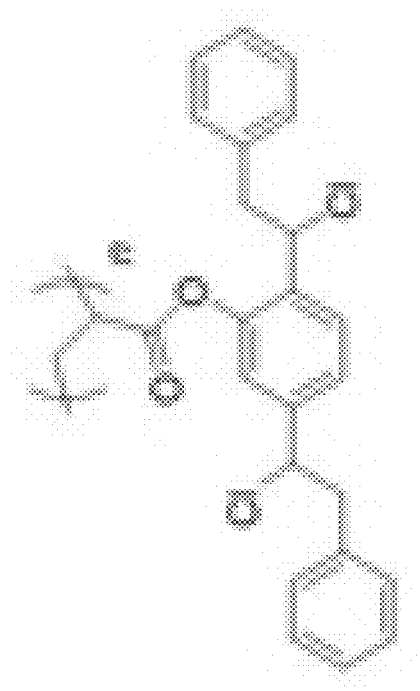

Previous work has reported the synthesis and electroluminescent properties of DP-PPV converted from a chloro precursor polymer. In one embodiment of the present invention, the bromo monomer 3 was obtained by reaction of the diol 1 with thionyl bromide (see FIG. 4). The iodo monomer 4 was prepared utilizing a Finkelstein reaction with the chloro monomer 2. Polymerization of the three halogenated monomers was achieved by adding one equivalent of potassium tert-butoxide (t-BuOK) to a stirred solution of the monomer in anhydrous tetrahydrofuran (THF) at 0° C. The reactions were allowed to warm to room temperature over a one hour time period. The bromo and iodo polymers were isolated by precipitation with methanol followed by centrifugation, which was found to limit material losses compared to filtering. It was noted that when stored under ambient light, the bromo polymer turned a deeper shade of yellow while the iodo polymer turned orange in color. A $^1$H NMR of the iodo polymer exposed to ambient light for 21 days indicated the halogen had eliminated. Subsequent samples were stored in the absence of light, which was found to prevent elimination of the halogen.

Figure 5:
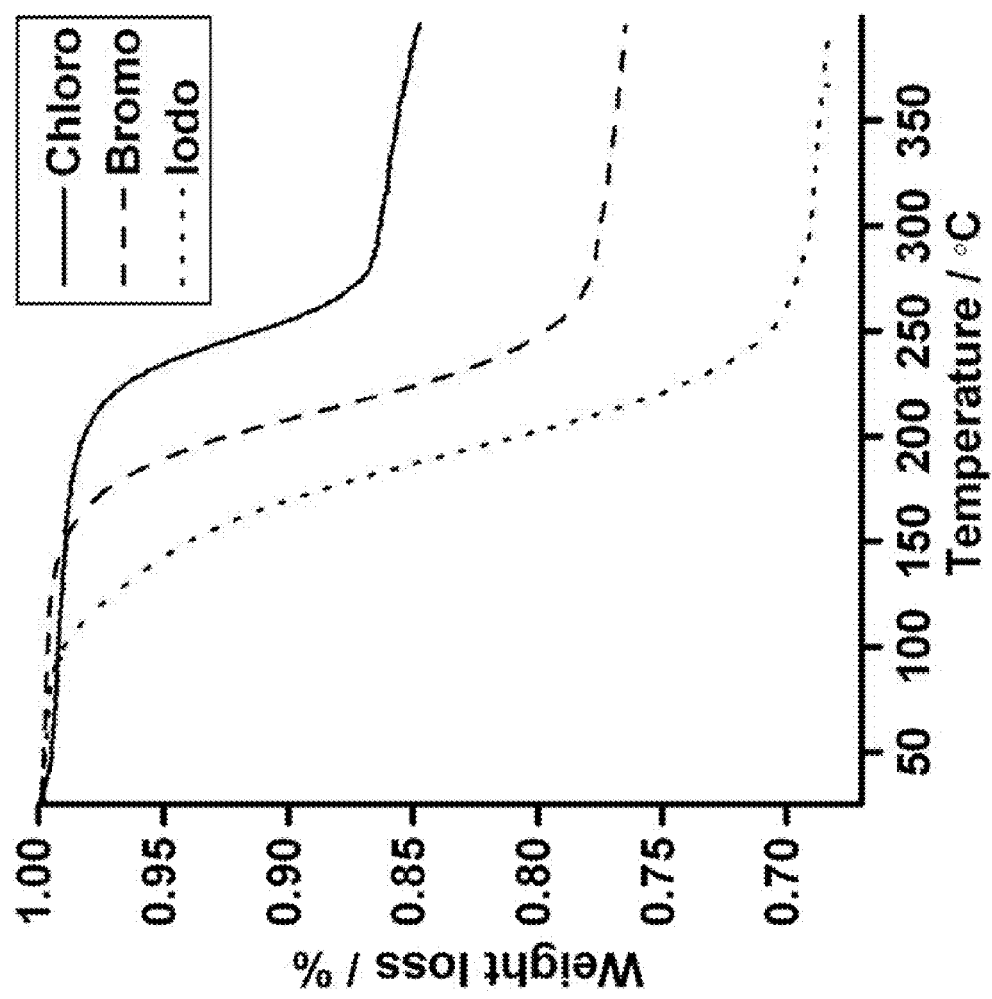
FIG. 5 shows thermogravimetric analyses data indicating the temperature at which the halogen leaving groups are eliminated.

Thermogravimetric analysis (TGA) was performed to determine the temperatures at which the halogens eliminated. It was found that the onset of elimination occurred at 180° C. for the chloro polymer, 137° C. for the bromo polymer, and 90° C. for the iodo polymer, indicating the relative decrease in carbon-halogen bond strengths (FIG. 5). It was estimated that the chloro polymer underwent a 12.3% mass loss (12.5% expected theoretically), the bromo polymer underwent a 21.4% mass loss (24.1% expected theoretically), and the iodo polymer underwent a 30.1% mass loss (33.5% expected theoretically), consistent with the loss of the corresponding halide (HX). The TGA results indicate the thermo-conversion temperature can be modulated by utilizing different stability leaving groups.

Figure 6:
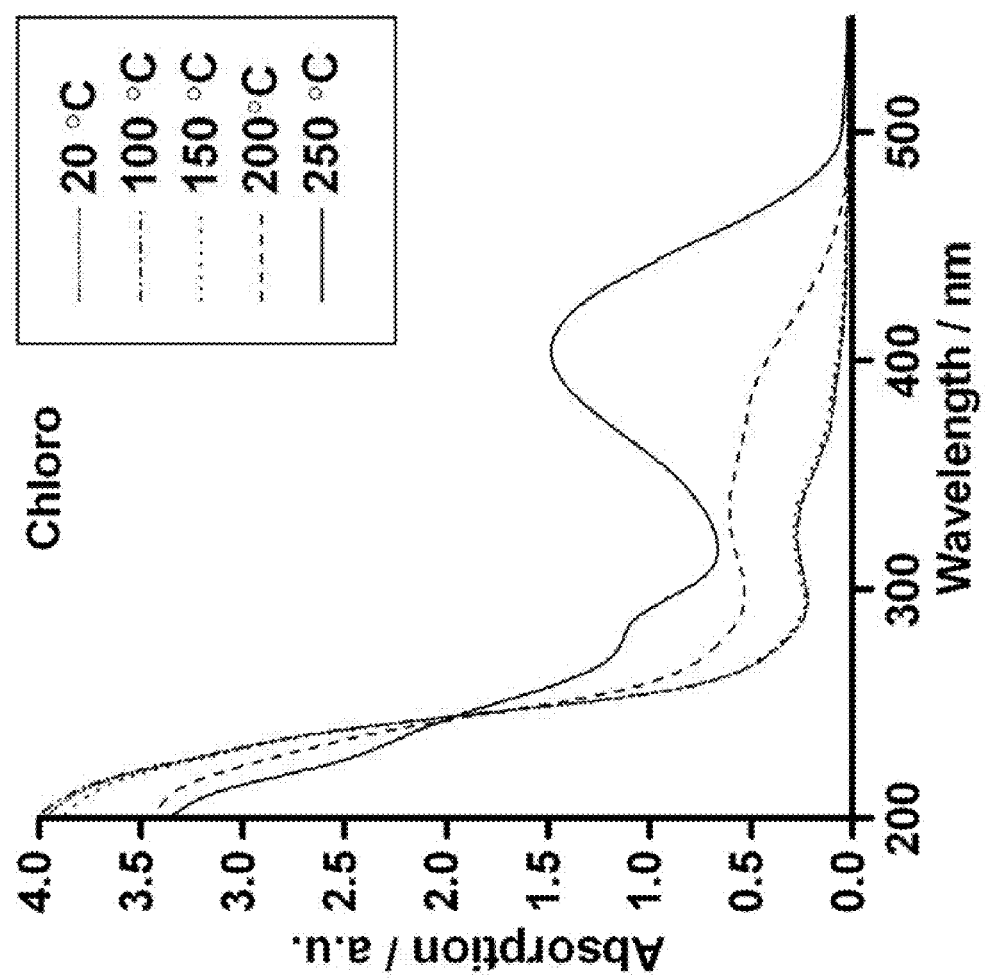
FIG. 6 shows UV-vis spectra data for a polymer precursor with bromine leaving groups.
Figure 7:
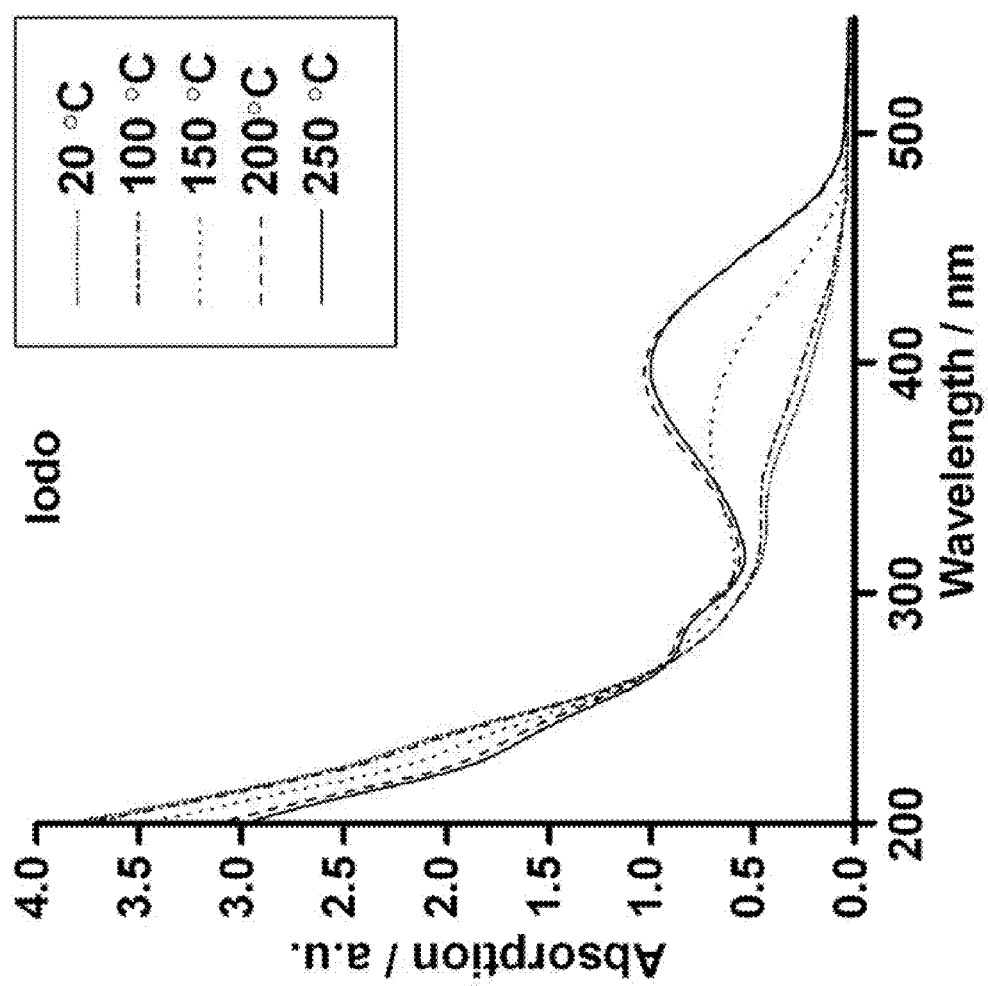
FIG. 7 shows UV-vis spectra data for a polymer precursor with iodine leaving groups.

To confirm the halogen elimination resulted in the polymers irreversible conversion to a conjugated state, UV-vis spectroscopy was performed. Solutions were prepared in chloroform (10 mg/mL) and deposited onto quartz slides. Excess sample was removed by tilting the slides to a vertical position while the sample was in contact with filter paper. The samples were air dried and UV-vis spectra were recorded on the bromo and iodo precursor polymers (FIGS. 6 and 7, respectively). Subsequent measurements were taken after the samples had been heated in an oven to 100, 150, 200 and 250° C. (30 minutes at each temperature). The thermal ramping was conducted under an ambient atmosphere with no attempt to exclude oxygen. As the temperature was increased, a new band at approximately 400 nm appeared for all three polymers, a result of $\pi \rightarrow \pi^*$ transitions along the conjugated polymer backbone. The absorption spectra of the bromo polymer was changed after heating to 150° C., and the iodo polymer began to change after 100° C., in good agreement with the TGA results.

The high dipole density of the halogens bromine and iodine make them attractive as leaving groups in the precursor polymers. The bromo polymer prepared was 1,4-bis(bromomethyl)-2,3-diphenylbenzene ($C_{20}H_{16}Br_2$). To synthesize this compound, 1,4-bis(hydroxymethyl)-2,3-diphenylbenzene (2.00 g, 6.88 mmol) was stirred in thionyl bromide (4.50 mL, 58.0 mmol) at room temperature for 6 h. The solution was cooled to 0° C. and ice cold de-ionized $H_2O$ (5 mL) was added dropwise. The mixture was extracted with ethyl acetate (EtOAc) and washed with de-ionized $H_2O$, $NaHSO_3$, and brine, dried over $Na_2SO_4$, and the solvent was evaporated (rotovap). Column chromatography was performed (0-5% EtOAc/hexane) to yield the desired compound ($C_{20}H_{16}Br_2$, 2.50 g, 87%) as a white solid. The melting point (mp)=139° C. $^1$H NMR (CDCl$_3$, δ): 7.54 (s, 2H, Ar H), 7.16-7.02 (m, 10H, Ar H), 4.26 (s, 4H, CH$_2$Br). $^{13}$C NMR (CDCl$_3$, δ): 142.4, 138.1, 136.5, 130.3, 130.1, 127.8, 127.1, 32.4. IR (KBr): v=3078-3026 (w; Ar C—H stretch), 2969 cm$^{-1}$ (w; C—H stretch). Analytically calculated for $C_{20}H_{16}Br_2$: C, 57.72; H, 3.88; found: C, 57.51; H, 4.06.

The iodo polymer prepared was 1,4-bis(iodomethyl)-2,3-diphenylbenzene ($C_{20}H_{16}I_2$). To a solution of 1,4-bis(chloromethyl)-2,3-diphenylbenzene 2 (1.10 g, 3.05 mmol) in acetone (15 mL) was added KI (2.23 g, 12.2 mmol). The reaction was brought to reflux for 5 h, allowed to cool, and the solvent was evaporated (rotovap). The residue was dissolved in EtOAc and washed with de-ionized $H_2O$ and brine, dried over $Na_2SO_4$, and the solvent was evaporated (rotovap). The product was recrystallized from EtOAc and then triturated in hexane (to remove the residual color). The desired product ($C_{20}H_{16}I_2$, 1.21 g, 78%) was obtained as a beige colored solid. mp=175° C. $^1$H NMR (CDCl$_3$, δ): 7.45 (s, 2H, Ar H), 7.16-7.03 (m, 10H, Ar H), 4.21 (s, 4H, CH$_2$I). $^{13}$C NMR (CDCl$_3$, δ): 142.0, 138.3, 137.3, 130.1, 197.7, 127.8, 127.0, 5.5. IR (KBr): v=3077-3021 (w; Ar C—H stretch), 2968-2852 cm$^{-1}$ (w; C—H stretch). Analytically calculated for $C_{20}H_{16}I_2$: C, 47.09; H, 3.16; found: C, 47.51; H, 3.43.

Potential leaving groups that can be used are shown in Table 1, listing the leaving group and its corresponding predicted conversion temperature to a conjugated state.

TABLE 1

| Leaving Group | Structure | Temperature (predicted) |
|---|---|---|
| Fluoride | —F | (250° C.) |
| Chloride | —Cl | 200° C. |
| Bromide | —Br | 150° C. |
| Iodide | —I | 100° C. |
| Ester | —OCOR | (200-250° C.) |
| Xanthate | —SCSR | 150-170° C. |
| Nitrile | —CN | (<100° C.) |
| Amine | —NR$^1$R$^2$ | (200° C.) |
| Nitro | —NO$_2$ | (<100°C.) |
| Carbonate | —OCOOR | (200° C.) |
| Sulfonium | —S$^+$R$^1$R$^2$ X$^-$ | 200° C. |
| Oxonium | —O$^+$R$^1$R$^2$ X$^-$ | (200° C.) |
| Iodonium | —I$^+$R$^1$R$^2$ X$^-$ | (200° C.) |
| Pyridinium | —N$^+$C$_5$H$_5$ X$^-$ | (200° C.) |
| Ammonium | —N$^+$R$^1$R$^2$ X$^-$ | (200° C.) |
| Borate | —B(OR)$_2$ | (200° C.) |
| Borane | —BH$_2$ | (250° C.) |
| Dithiocarbamate | —SC(S)NR$^1$R$^2$ | (95-130° C.) |
| Sulphinyl | —SOR | 200° C. |
| Sulfonyl | —SO$_2$R | (150° C.) |

Figure 8:
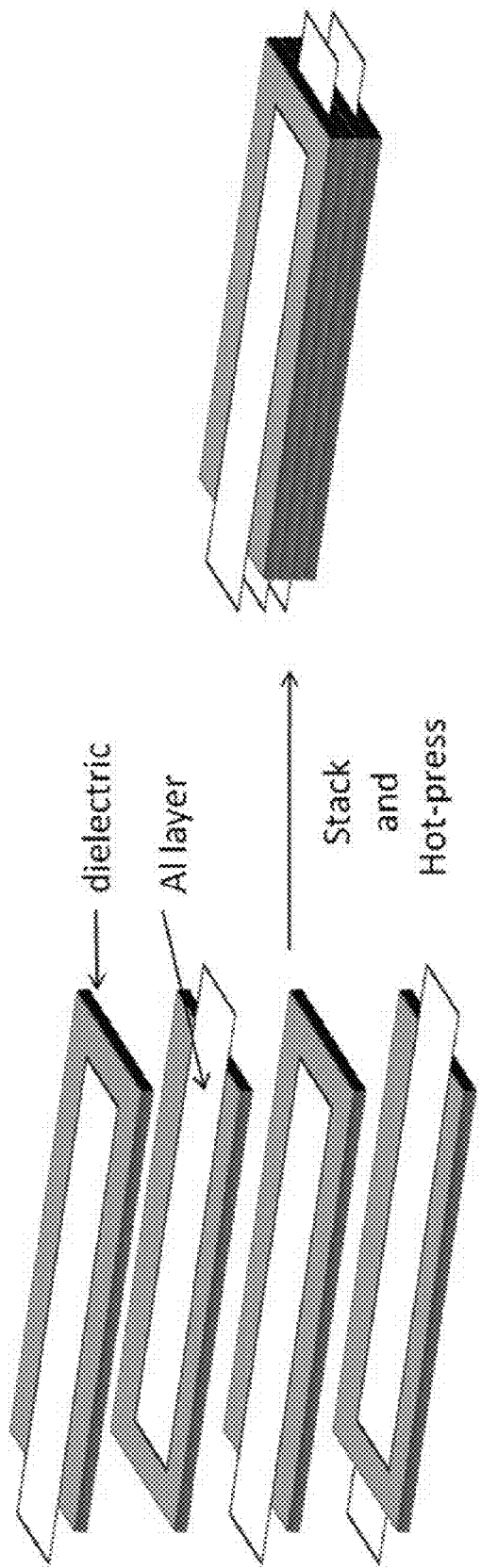
FIG. 8 illustrates one embodiment of the method of the present invention.

The prepared precursor polymer can be cast onto a substrate and subsequently utilized as a capacitor. In one embodiment of the method of the present invention (see FIG. 8), the precursor polymer with the pre-selected leaving group is prepared and solvent cast onto a substrate to prepare a thin (less than approximately 50 microns) polymer precursor film. This polymer film is then metalized using a pattern deposition technique such as support coating or evaporation on one face of the polymer film. The metallization can be done using any standard metal, such as aluminum, gold, silver, copper and nickel. The polymer films are then stacked or rolled to form a capacitor stack. The stacking is accomplished using an offset technique that allows every other layer to contact the same electrode end. The capacitor ends are then metalized and a contact is attached.

The capacitor can then be implemented in a circuit such that certain electrical properties, such as capacitance and the dissipation factor (DF), and equivalent series resistance (ESR) are affected when an approximate temperature is reached when the leaving group or groups are eliminated and the polymer conjugates.

Electrical measurements were performed on the chloro precursor polymer to determine the dielectric constant (k) and the dissipation factor (DF); similar results would be expected for the bromo and iodo precursor polymer of the present invention. Using a drawdown machine, a solution of the polymer (100 mg/mL, chloroform) was spread and allowed to air dry. Circular gold electrodes (6 mm in diameter, approximately 100 nm thick) were RF sputter deposited onto the polymer film using a stainless steel mask. The bottom side of the polymer film was coated with a blanket film of gold approximately 100 nm thick. Capacitance and DF values were recorded on 6 different areas of the film at 1 volt and frequencies of 20 Hz, 100 Hz, 1 KHz, 10 KHz, 100 KHz, and 1 MHz. The average dielectric constant over the entire frequency range was calculated to be 4.2±0.4, which is significantly higher than other non-fluorinated polymer dielectrics (polypropylene 2.2, polyethylene terephthalate 2.7, polystyrene 2.5). The high k value is attributed to significant polarizability in the polymer structure, and is an advantageous feature for dielectric materials because the capacitor dimensions can be minimized. The material also possessed a low DF that decreased slightly with frequency, indicating the polymer stores charge well.

A variable temperature experiment was performed on a metalized thin film of the chloro polymer to assess the material's performance as a capacitor at elevated temperatures. The edges of the polymer film were taped (with Katpon) to a thin piece of copper to prevent the film from curling at high temperatures. Measurements were taken at 10V and a frequency of 1 KHz. It was found that neither capacitance nor DF significantly changed until the temperature reached approximately 200° C., above which, the values significantly increased and then decreased. As the TGA and UV-vis studies indicate the chloro polymer begins to conjugate at just below 200° C., the sudden increase in capacitance and DF at the same temperature is attributed to the conjugation process. (It was also observed that the polymer film underwent an irreversible color change from light yellow to dark orange as the temperature exceeded approximately 225° C.). The sudden increase in capacitance and DF are attributed to two major factors: first, conjugation creates a new path for electron flow through the delocalized p-system of the polymer backbone, causing an increase in the conductivity and polarizability of the material. Additionally, HCl (a small polarizable molecule with a dipole moment of 1.109 debye) is released during conjugation; doping of conjugated polymers with strong acids is known to cause a large increase in conductivity. However, at high temperatures, HCl would quickly be driven from the sample, consistent with the subsequently observed decrease in capacitance and DF. XPS analysis performed on a non-metalized area of the thermally treated film showed 0.3% chlorine content, indicating a near complete elimination and ejection of HCl from the surface of the polymer.

Although the capacitance of the material initially increased, the corresponding spike in dissipation factor is a better indication that the polymer was no longer holding charge (that is, failing). As HCl evolved from the sample, the capacitance dropped to 9% of the initial room temperature value, followed by an additional 3% decrease as the material cooled to room temperature, indicating an extremely limited ability of the polymer to store charge after the thermo-conversion. Likewise, after the initial spike, the dissipation factor remained at approximately 0.3, representing a 75-fold increase over the room temperature value. These results clearly demonstrate irreversible capacitor failure.

The results show that the synthesized new DP-PPV precursor polymers can exhibit temperature induced conjugation which is determined by the stability of the leaving groups. Electrical characterization of the chloro precursor polymer indicates that these materials (the halogen DP-PPV polymers) function as insulators with a higher dielectric constant than commercial non-fluorinated polymer dielectrics. With a low dissipation factor and a wide range of operating temperatures (with the appropriate stability leaving group), precursor DP-PPV polymers are well suited for dielectric applications. Furthermore, because the polymer undergoes a temperature induced transition from a non-conjugated to a conjugated state, the resultant conductivity change can be utilized to disable a capacitor. Because the conjugation temperature can be altered by the choice of leaving group, different 'set' temperatures can be chosen for capacitor failure. By employing thermo-converting capacitor dielectrics in electronics, capacitors can be effectively shut down in the event of a fire or overheating, providing a fundamental safety mechanism in electronic devices.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

We claim:

1. A method of making a weak-link capacitor, comprising:
   preparing a precursor polymer selected from the group consisting of a poly(phenylene vinylene), polyacetylene, poly(p-phenylene), poly(thienylene vinylene), poly(1,4-naphthylene vinylene), and polyp-pyridine vinylene), said precursor polymer comprising a leaving group;
   casting said precursor polymer onto multiple individual substrates as thin films;
   forming a capacitor by stacking said thin films using an offset technique; and
   metalizing at least one end of said stack of thin films and attaching a contact to make a weak-link capacitor.

2. The method of claim 1 wherein said leaving group is selected from the group consisting of a chloride, a bromide, an iodide, a fluoride, an ester, an xanthate, a nitrile, an amine, a nitro group, a carbonate, a dithiocarbamate, a sulfonium group, an oxonium group, an iodonium group, a pyridinium group, an ammonium group, a borate group, a borane group, a sulphinyl group, and a sulfonyl group.

3. The method of claim 1 further comprising the step of metalizing said thin films using a metal selected from aluminum, gold, silver, copper and nickel.

4. The method of claim 1 wherein said weak-link capacitor is energized by a method selected from heating or ultraviolet radiation exposure to an energy level sufficient to eliminate said leaving groups.

5. The method of claim 1 wherein said poly(phenylene vinylene) precursor polymer comprising a leaving group is selected from $C_{20}H_{16}Br_2$ and $C_{20}H_{16}I_2$.

6. A method comprising:
   tethering a precursor polymer selected from the group consisting of poly(phenylene vinylene), polyacetylene, poly(p-phenylene), poly(thienylene vinylene), poly(1,4-naphthylene vinylene), and poly(p-pyridine vinylene), said precursor polymer comprising a leaving group to a polymer comprising an orthogonal photo-polymerizable group.

7. The method of claim 6 wherein said orthogonal photo-polymerizable group is polyacrylate.

8. The method of claim 6 wherein said precursor polymer comprising a leaving group tethered to a polymer comprising an orthogonal photo-polymerizable group is photo-chemically converted using a direct-write process to form a conductive material.

\* \* \* \* \*